(12) United States Patent
Shimoda et al.

(10) Patent No.: US 7,165,724 B2
(45) Date of Patent: Jan. 23, 2007

(54) PORTABLE TERMINAL

(75) Inventors: Yuji Shimoda, Inagi (JP); Takashi Matsunuma, Inagi (JP); Takao Obata, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/487,630

(22) PCT Filed: Aug. 23, 2001

(86) PCT No.: PCT/JP01/07219

§ 371 (c)(1),
(2), (4) Date: Feb. 23, 2004

(87) PCT Pub. No.: WO03/019462

PCT Pub. Date: Mar. 6, 2003

(65) Prior Publication Data
US 2004/0245341 A1  Dec. 9, 2004

(51) Int. Cl.
*G06K 7/10* (2006.01)
(52) U.S. Cl. .............................. 235/462.45; 235/462.46
(58) Field of Classification Search ........... 235/462.45, 235/462.46, 472.01, 472.02, 472.03
See application file for complete search history.

(56) References Cited

U.S. PATENT DOCUMENTS

| | | | | |
|---|---|---|---|---|
| 5,227,617 A | * | 7/1993 | Christopher et al. ... | 235/462.13 |
| 5,371,348 A | * | 12/1994 | Kumar et al. .......... | 235/472.02 |
| 5,477,044 A | * | 12/1995 | Aragon .................. | 235/472.01 |
| 5,565,671 A | * | 10/1996 | Kirkeby et al. ........ | 235/472.01 |
| 5,576,530 A | * | 11/1996 | Hagerty ................. | 235/462.47 |
| 5,796,088 A | * | 8/1998 | Wall ....................... | 235/472.01 |
| 5,917,175 A | * | 6/1999 | Miller et al. ........... | 235/472.01 |
| 6,003,773 A | * | 12/1999 | Durbin et al. ......... | 235/462.45 |
| 6,076,023 A | | 6/2000 | Sato | |

FOREIGN PATENT DOCUMENTS

| | | |
|---|---|---|
| JP | 61-42661 | 3/1986 |
| JP | 03-171248 | 7/1991 |
| JP | 07-172521 | 7/1995 |
| WO | PCT/IPEA/409 | 7/2002 |
| WO | PCT/IB/338 | 3/2004 |

OTHER PUBLICATIONS

Korean Office Action issued on Dec. 23, 2005 with English translation.
Chinese Office Action issued on Apr. 7, 2006 with English translation.

* cited by examiner

*Primary Examiner*—Karl D. Frech
(74) *Attorney, Agent, or Firm*—Greer, Burns & Crain, Ltd

(57) ABSTRACT

A printing unit is built into an upper portion of a handheld terminal, a display unit is built into the middle portion, and a key inputting unit is built into a lower portion. A laser type scanner for reading a barcode, etc., is built into the right side of the main body, and a switch for turning on/off the scanner is built into the proximity of the bottom of the scanners. The scanner is aimed at the direction of a barcode, and the switch is turned on to irradiate a laser beam, so that the barcode can be read.

7 Claims, 8 Drawing Sheets

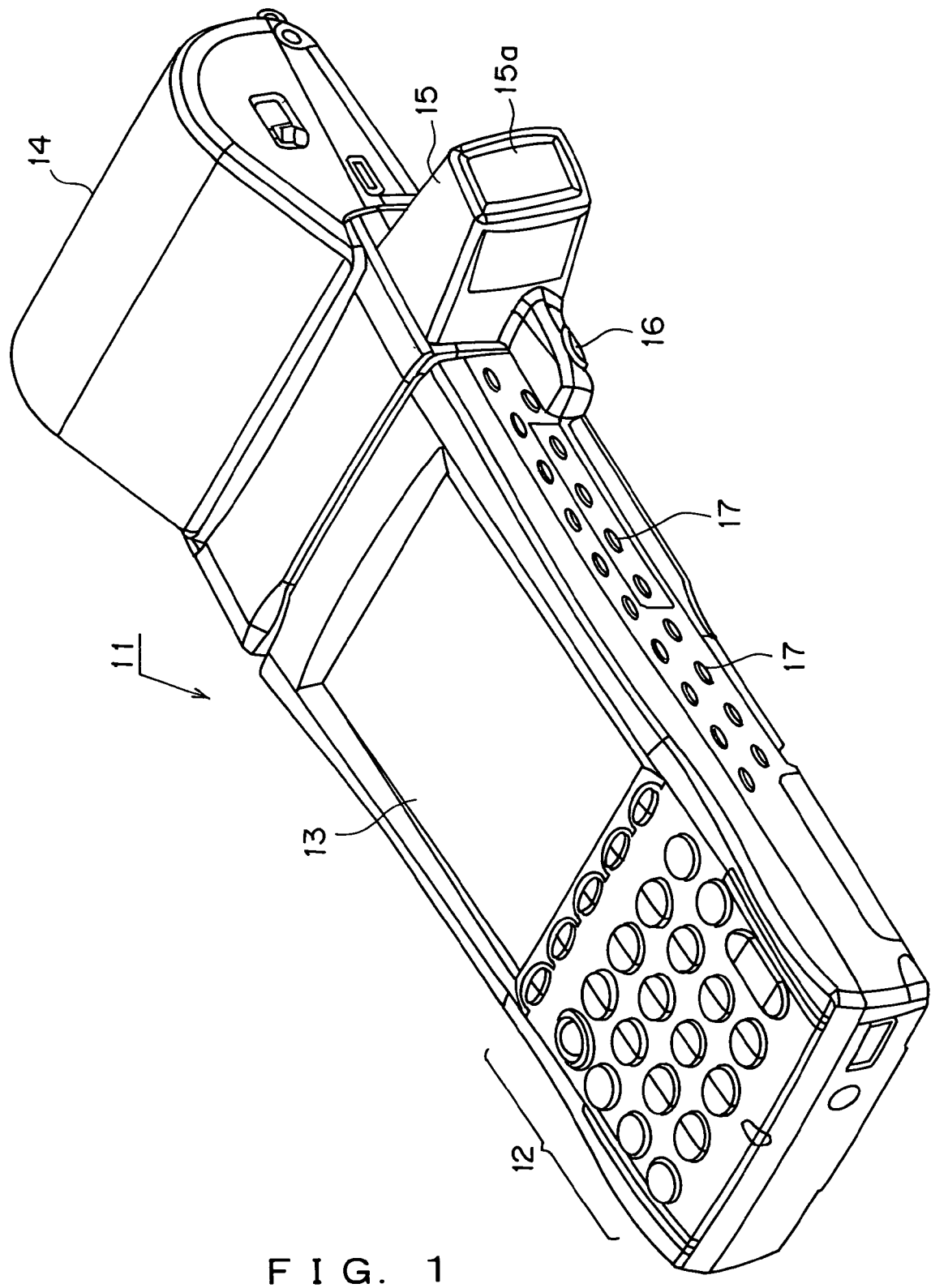
F I G. 1

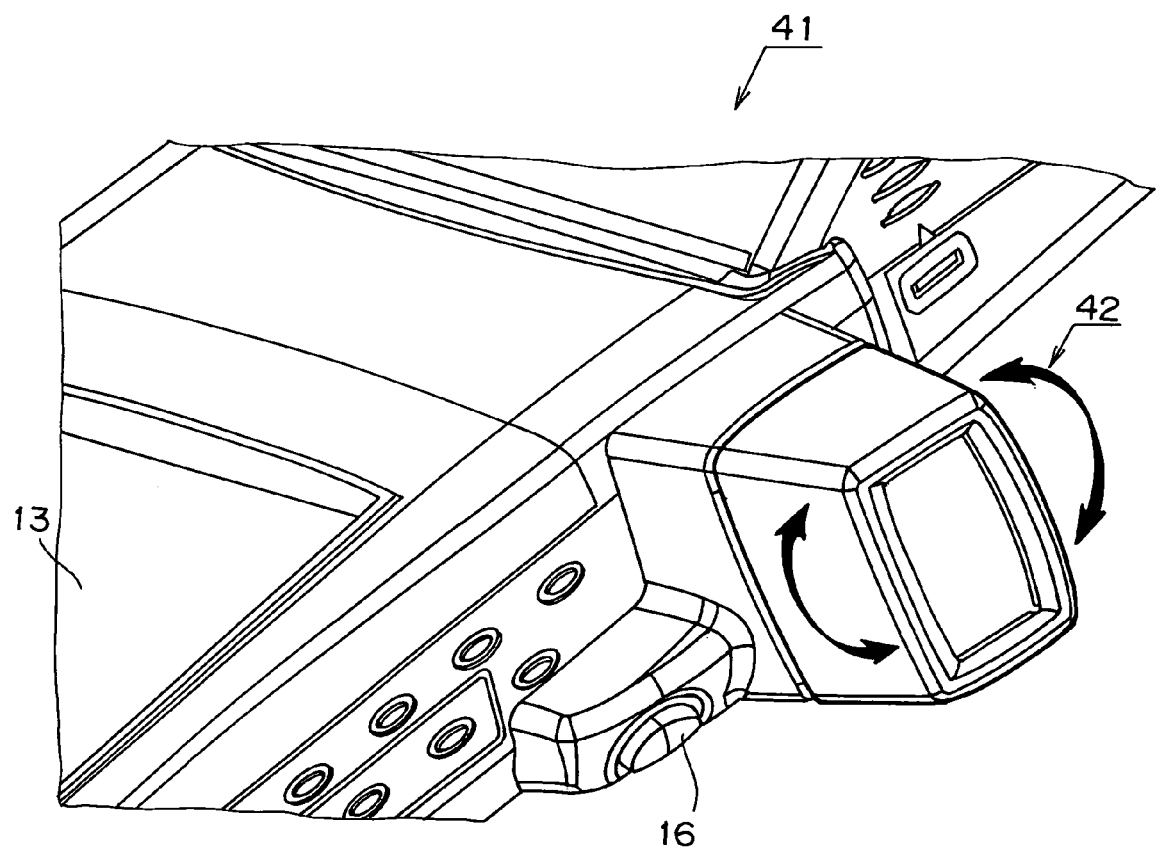
F I G. 5

PORTABLE TERMINAL

This application is a 371 of PCT/JP01/07219, filed Aug. 23, 2001.

TECHNICAL FIELD

The present invention relates to a portable terminal device.

BACKGROUND ART

Portable terminal devices such as a handheld terminals, etc. have been used as a tool for managing inventory and tracking the sales of a commodity. A handheld terminal requires a scanner for reading a barcode, etc. printed on a commodity. Additionally, some handheld terminals require a printing function for bills, etc. depending on their purposes, and printing units are built into the tips of the terminals.

For a handheld terminal having a scanner, the scanner is built into the tip of the main body of the device so that a barcode, etc. is easily scanned when the terminal is held in hand. Accordingly, a handheld terminal, whose printing unit is built into the tip of the main body of the device, adopts a structure where a scanner unit is separate from the main body, and the main body and the scanner unit are connected with a cable.

However, if a scanner and a handheld terminal are separated, a barcode must be scanned by respectively holding the handheld terminal in one hand and the scanner in the other, leading to very poor usability.

DISCLOSURE OF INVENTION

An object of the present invention is to improve the usability of a portable terminal device having a printing unit, when an image is read.

A portable terminal device according to the present invention comprises a key inputting unit, a display unit, a printing unit, and an image reading unit built into the lateral side or the back side of the main body of the device.

According to the present invention, for example, a bill, etc. can be printed with the printing unit, a barcode, etc. can be read with the image reading unit, and there is no need to connect the image reading unit to the main body of the device with a cable, etc. Therefore, the usability of the portable terminal device can be improved.

In the present invention, a switch for turning on the image reading unit may be built into a position that can be operated when the image reading unit is directed at a target to be read. Additionally, the switch may be built into the proximity of the bottom of the image reading unit, so that the switch can be operated with a finger.

With this configuration, an image such as a barcode, etc. can be read by operating the portable terminal device with one hand.

In the present invention, the image reading unit may be installed to be rotatable.

With this configuration, the scanning direction of the image reading unit can be changed, for example, according to the direction in which a barcode is printed. Therefore, a barcode can be read holding the device in one position, even if the barcode is printed in any direction such as vertical or horizontal.

BRIEF DESCRIPTION OF DRAWINGS

FIG. 1 is an external view of a handheld terminal according to the first preferred embodiment;

FIG. 5 is an external view of a principal part of the fourth preferred embodiment;

BEST MODE OF CARRYING OUT THE INVENTION

Figure 2:
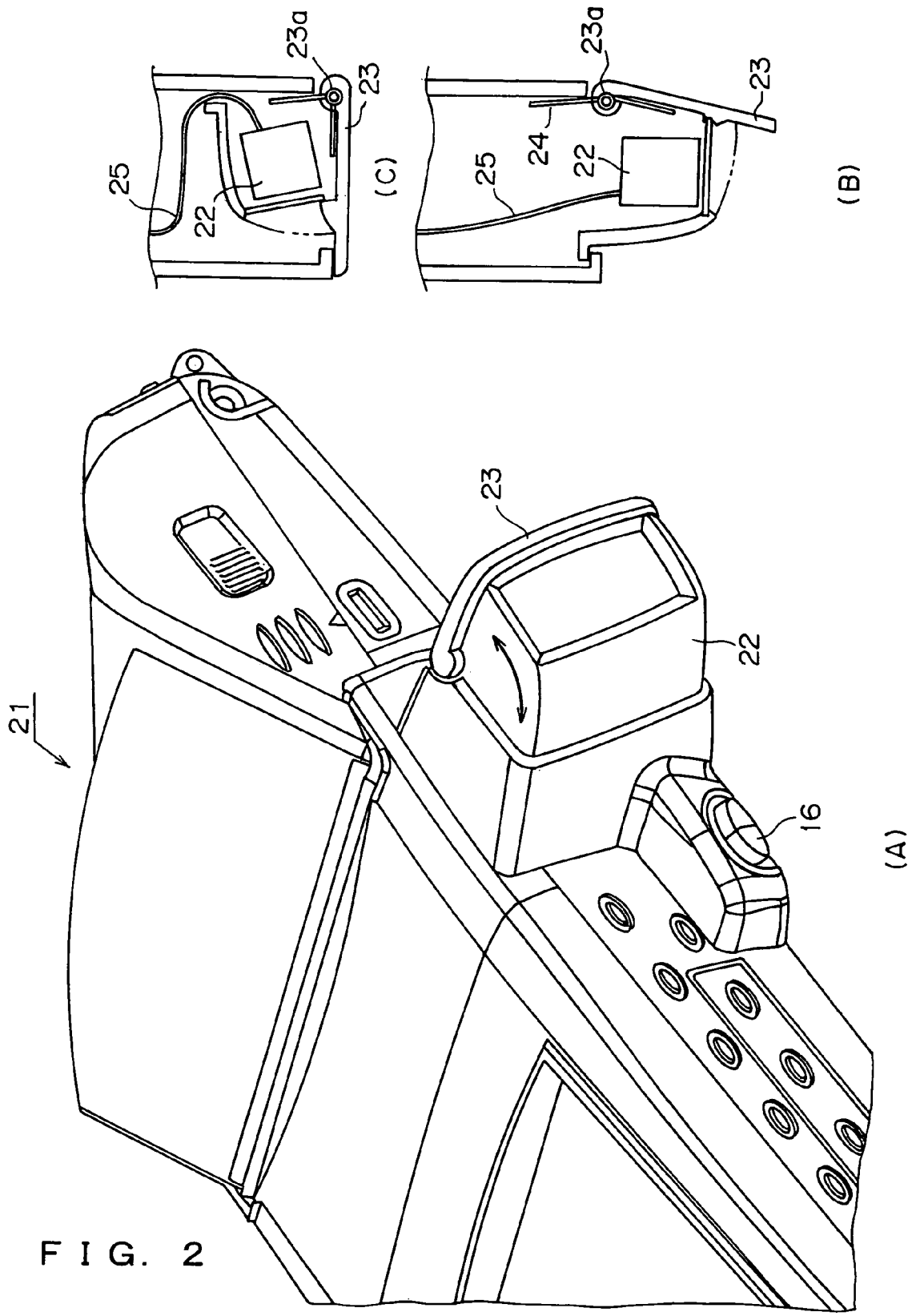
FIGS. 2A to 2C are an external view of the second preferred embodiment and its internal structure.

Hereinafter, preferred embodiments according to the present invention are explained with reference to the drawings. FIG. 1 is an external view of a handheld terminal (portable terminal device) 11 according to the first preferred embodiment.

A key inputting unit 12 is into the lower portion of the main body of the handheld terminal 11, , and a display unit 13 configured by a liquid crystal display device, etc. is built in above the key inputting unit 12.

A laser type scanner (image reading unit) 15 for reading a barcode, etc. is built into the right side of the handheld terminal 11, and a switch 16 for turning on/off the scanner 15 is built into the terminal in the proximity of the bottom of the scanner 15. The switch 16 has a body which tilts slightly from upward to downward. When the handheld terminal 11 is held in one hand, fingers will naturally touch the switch 16.

Furthermore, many projections 17 for preventing the handheld terminal 11 from being dropped when the handheld terminal 11 is held in one hand are built into the lateral side of the handheld terminal 11.

When a barcode printed on a commodity is read, it is scanned by aiming the irradiation window 15a of a laser beam of the scanner 15 at the barcode to be read, and by pressing the switch 16 with a finger. Information such as the commodity name, which corresponds to the barcode read at this time, is displayed on the display unit 13. Therefore, whether or not the contents of the read barcode are correct can be verified on the spot.

Or, if it is desired to issue a bill by using the handheld terminal 11, data, etc. of the bill stored inside can be printed with the printing unit 14 and output.

In explanations of the following preferred embodiments, the printing unit 14 is not always shown in an external view. However, all handheld terminals have the printing unit 14 in the tip. Furthermore, in the drawings of the respective preferred embodiments, the same constituent elements as those shown in FIG. 1 are denoted with the same reference numerals, and their explanations are omitted.

FIGS. 2A to 2C show an external view of a handheld terminal 21 according to the second preferred embodiment of the present invention, which can house a scanner 22 on the side of the main body, and the internal structure of the scanner 21.

In FIG. 2A, the scanner 22 is structured to be housed in the handheld terminal 21. By pressing a cover 23 of the scanner 22 in a downward direction (downward direction of FIG. 2) with fingers, the scanner 22 can be housed within the handheld terminal 21.

FIG. 2B shows the internal structure in the state where the cover 23 is open, that is, in the state where a barcode can be read, whereas FIG. 2C shows the internal structure when the scanner 22 is housed inside by closing the cover 23.

A spring 24 applies force in an external direction to the cover 23. In the state where a force is not applied externally, the cover 23 is kept open. The scanner 22 is connected to an internal control substrate (not shown) by a cord 25, and irradiates a laser beam and receives a reflected beam under the control of a controlling unit.

In the state where the cover 23 is open, an irradiation window 22a of the scanner 22 is aimed outward, and a barcode, etc. can be read.

If a user of the handheld terminal 11 applies force in the downward direction by holding down the cover 23 with fingers, the cover 23 rotates on an axis 23a in a clockwise direction, and the scanner 22 is housed in the handheld terminal 11. The cover 23 has an engagement portion, although this is not shown. The cover 23 engages with a protrusion on the side of the handheld terminal 11, so that the cover 23 is kept stationary in that position.

Figure 3:
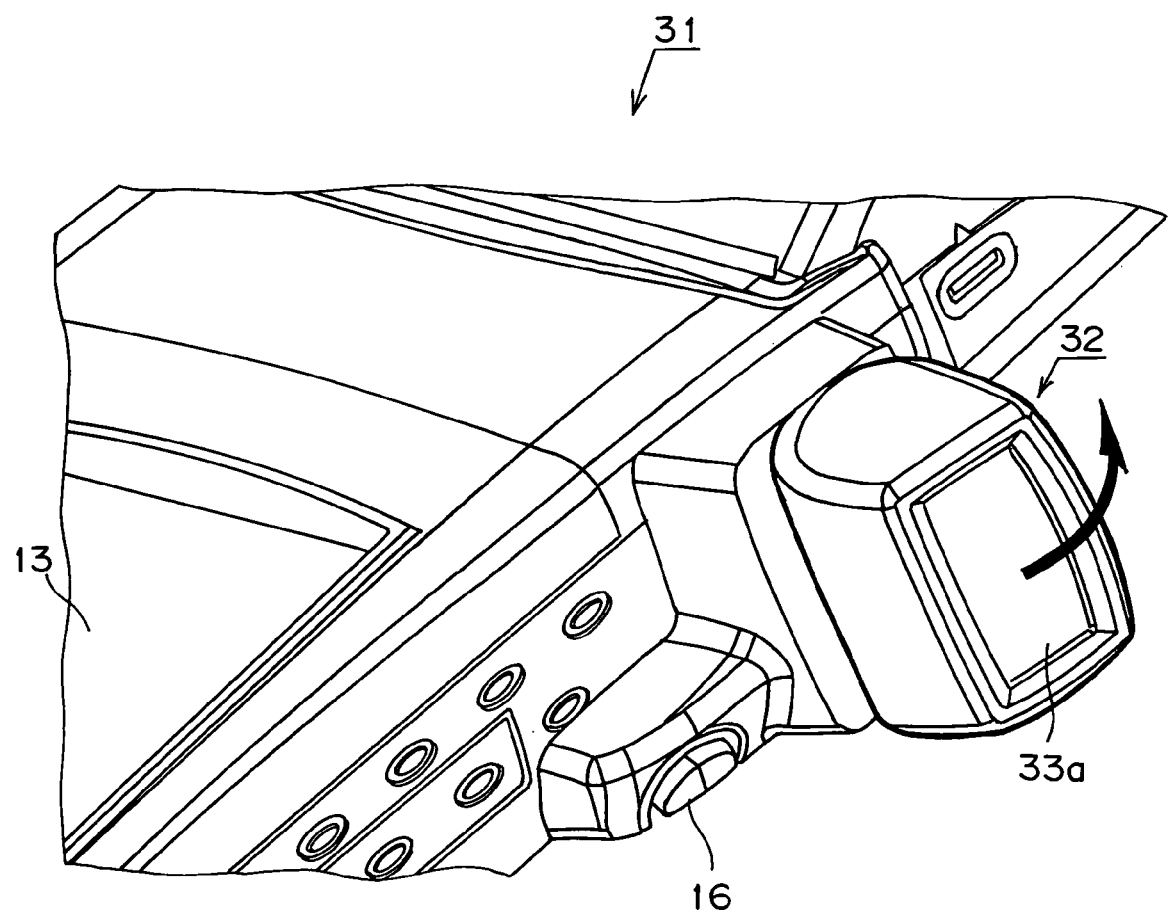
FIG. 3 is an external view of a principal part of the third preferred embodiment.

Next, FIG. 3 is an external view of the principal part of the third preferred embodiment according to the present invention, in which a scanner unit 32 can rotate in an upward direction relative to the lateral side of a handheld terminal 31.

As shown in FIG. 3, the scanner unit 32 built into the lateral side of the handheld terminal 31 is installed to be rotatable in the upward direction (direction indicated by an arrow in FIG. 3) when viewed from the front on which the display unit 13 is installed.

FIGS. 4A to 4C show the internal structure of the scanner unit 32, and its state when being rotated.

As shown in FIG. 4C, the scanner unit 32 is composed of a case 33 and a scanner 34 housed in the case 33. A hole is built into the case 33, and is inserted in an axis 35 on the side of the handheld terminal 31, so that the case 33 is supported and rotatable. Additionally, a cable 36 by which a signal that controls the emission of a laser beam and the reception of a reflected beam is transmitted is connected to the scanner 34.

When a barcode, etc. printed on a commodity is read, the scanner unit 32 is kept stationary to aim the irradiation window 33a towards the right (the right of FIG. 3, the bottom of FIG. 4A).

When the scanner 34 is not used, a user rotates the scanner unit 32 in the upward direction (the direction indicated by an arrow shown in FIG. 3, the right direction shown in FIG. 4A) so as to orientate the irradiation window 33a in the upward direction.

In this way, the irradiation window 33a that is relatively susceptible to impact can be aimed towards the tip of the handheld scanner 31, when the scanner 34 is not used. Therefore, the irradiation window 33a can be prevented from being directly impacted and damaged due to dropping the handheld terminal 31 in use, or the like.

Next, FIG. 5 is an external view of the principal part of the fourth preferred embodiment according to the present invention, in which a scanner unit 42 can rotate on an axis perpendicular to the side of the handheld terminal 41.

As shown in FIG. 5, the scanner unit 42 on the right side of the handheld terminal 41 is installed to be rotatable clockwise and counterclockwise parallel to the lateral side.

FIGS. 6A and 6B show the internal structure of the scanner unit 42 according to the fourth preferred embodiment, and its state when being rotated.

As shown in FIG. 6A, the scanner unit 42 is composed of a case 43 and a scanner 44 housed in the case 43. the case 43 has a cylindrical convex portion 45, and is inserted into a hole 46 on the side of the handheld terminal 41, so that the case 43 is supported and rotatable. Additionally, a cable 47 by which a signal that controls the emission of a laser beam and the reception of a reflected beam is transmitted is connected to the scanner 44.

When a barcode, etc. printed on a commodity is read, the scanner unit 42 is kept stationary in the position shown in FIG. 5, or in a position rotated 90 degrees in the clockwise or the counterclockwise direction (directions indicated by arrows shown in FIG. 5) relative to the right side of the handheld terminal 41.

For example, if boxes are stacked in a way such that their barcodes are arranged vertically when viewed from a user of the handheld terminal 41, scanning must be performed in the direction where they are printed in order to read the barcodes.

However, the scanning direction of the scanner 44 of the handheld terminal 41 is predetermined to be one direction. For example, the scanning direction is set to be the direction orthogonal to the longitudinal direction of the handheld terminal 41, namely, the horizontal direction when the handheld terminal 41 is held in a hand. Accordingly, if a barcode is printed vertically, it must be scanned in the state where the wrist is bent 90 degrees. Therefore, its usability is not so good.

In such a case, as shown in FIG. 6B, by rotating the scanner unit 42 90 degrees from the normal position, the barcode printed vertically can be read with exactly the same operation as that in the case where a barcode is printed horizontally is read.

Accordingly, even if a barcode, etc. to be read is positioned in any direction, it can be scanned by rotating the scanner unit 42 without stressing the a wrist. As a result, the usability can be improved.

Figure 7:
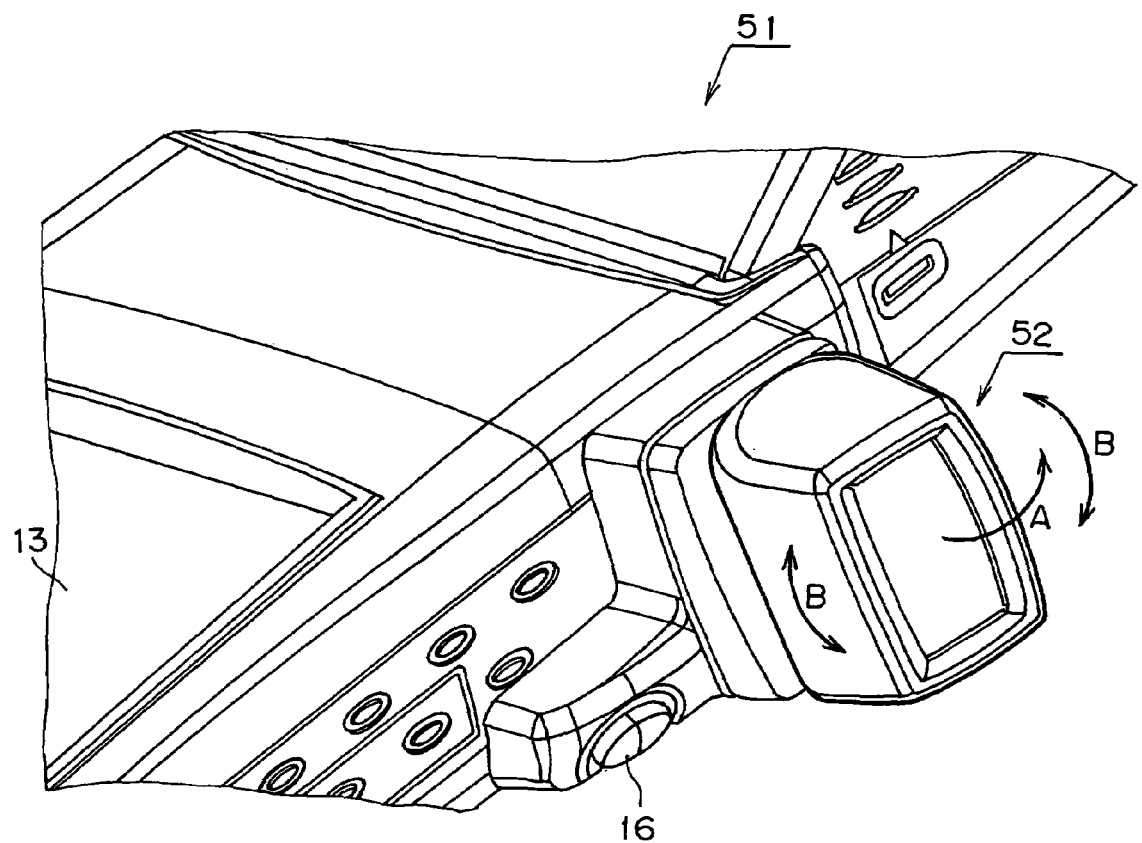
FIG. 7 is an external view of a principal part of the fifth preferred embodiment.

Next, FIG. 7 is an external view of the principal part of the fifth preferred embodiment according to the present invention, in which a scanner unit 52 is built into the lateral side of a handheld terminal 51, and installed to be rotatable upwards (direction indicated by an arrow A in FIG. 7) relative to the lateral side, and clockwise and counterclockwise (directions indicated by arrows B in FIG. 7) parallel to the lateral side.

Figure 4:
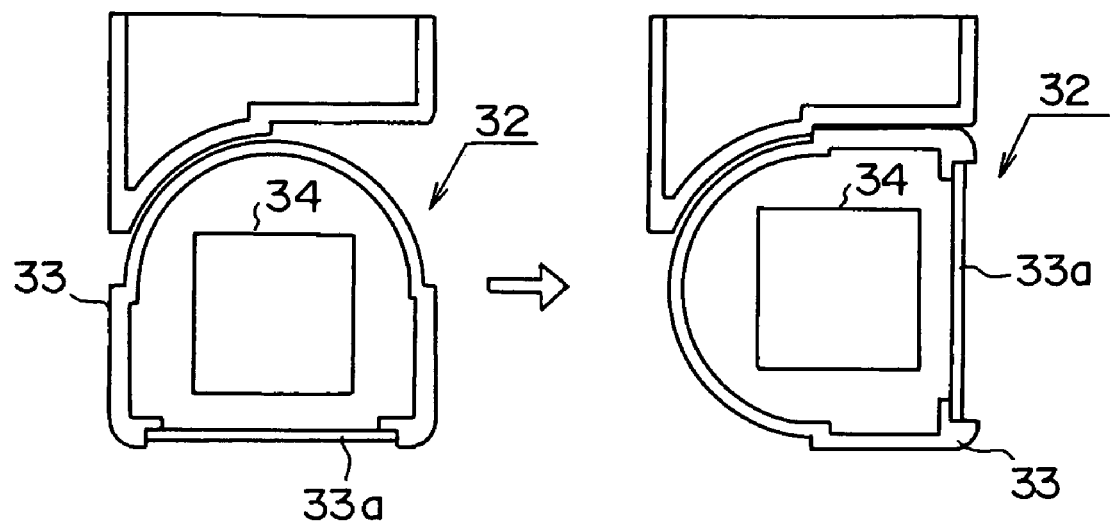
FIGS. 4A to 4C show the internal structure of the third preferred embodiment, and its state when being rotated.
Figure 4:
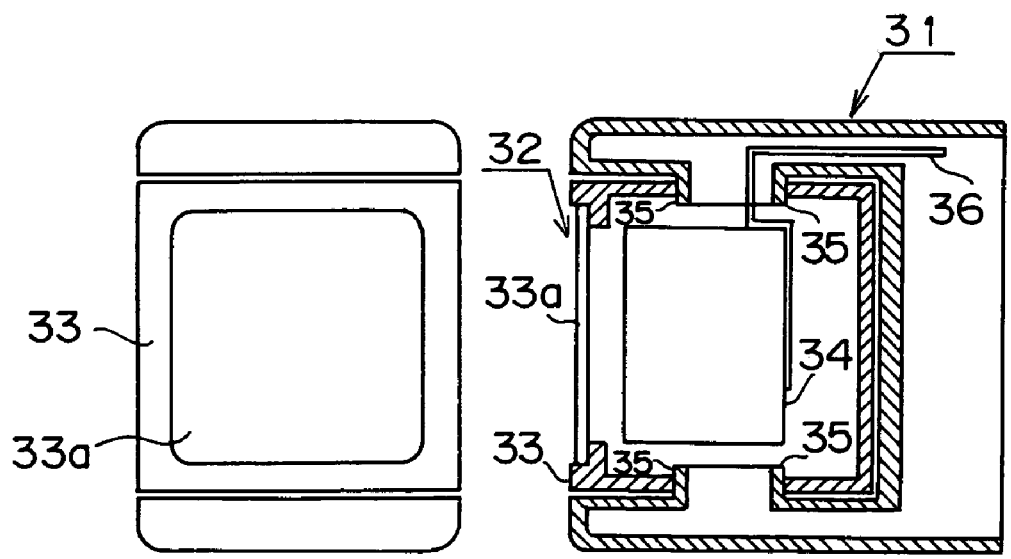
Figure 6:
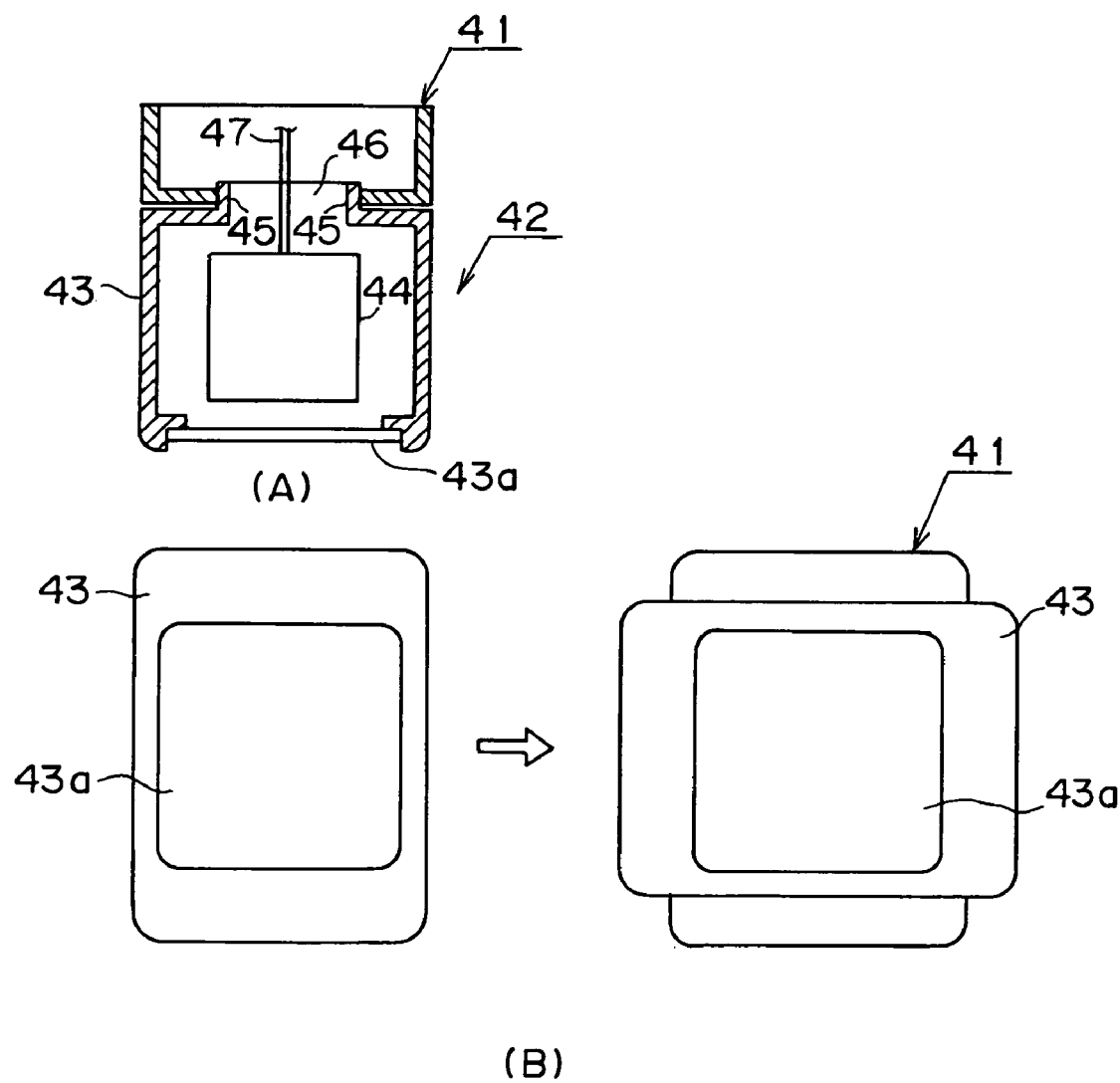
FIG. 6 shows the internal state of the fourth preferred embodiment, and its state when being rotated.

The structure for rotating the scanner unit 52 according to this fifth preferred embodiment is implemented by combining the rotation structure according to the third preferred embodiment shown in FIG. 4, and the rotation structure according to the fourth preferred embodiment shown in FIG. 6.

According to the fifth preferred embodiment, the scanner unit 52 can be rotated upwards, clockwise, and counterclockwise parallel to the lateral side of the handheld terminal 51.

Accordingly, for instance, if barcodes are printed vertically depending on the way of commodity loading, etc., the scanning direction can be changed to vertical by rotating the scanner unit 52. Therefore, the barcodes can be read in the state where the handheld terminal 51 is held in hand, and wrist extended. In this way, a barcode can be read with the same operation without being influenced by the direction of the barcode.

Figure 8:
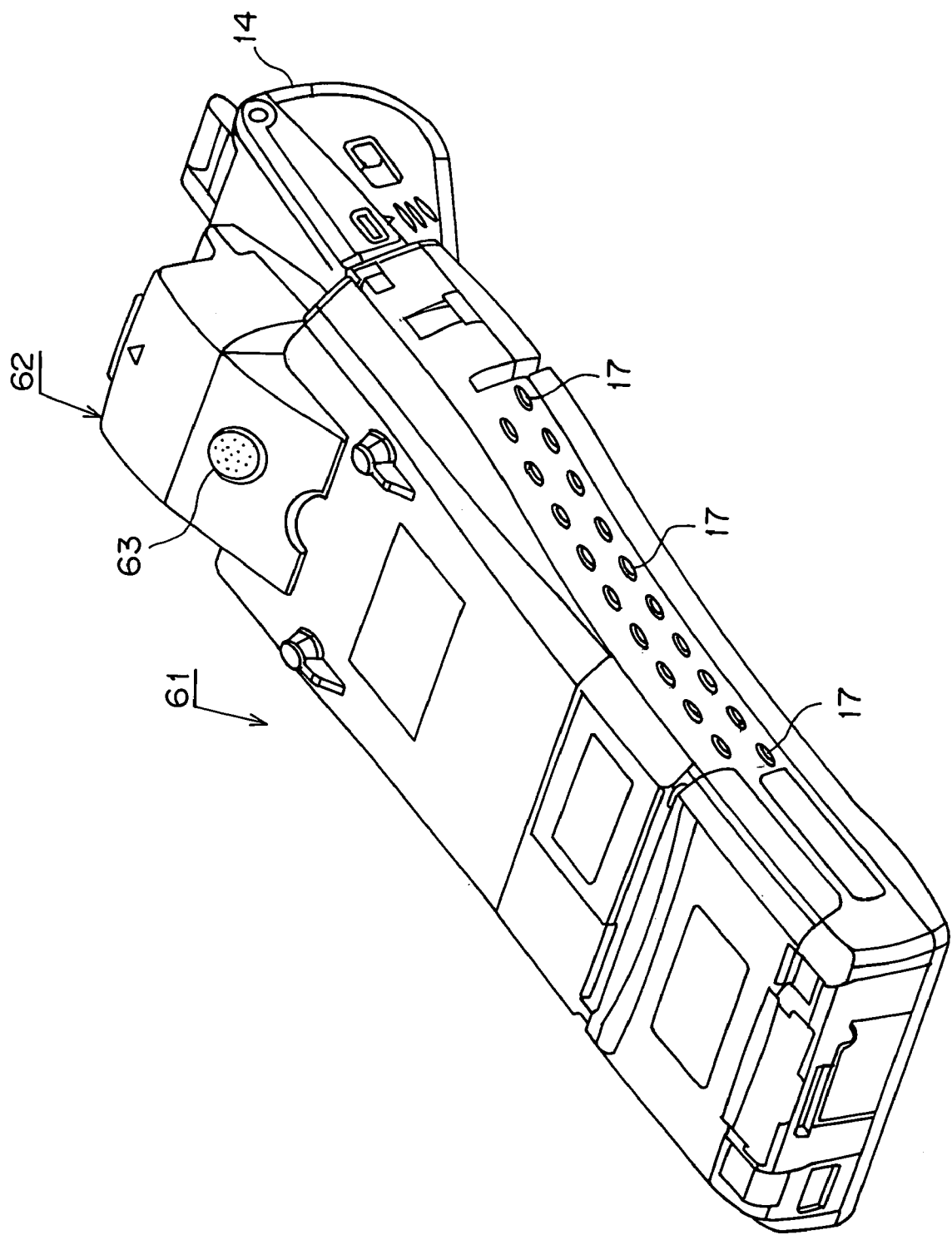
FIG. 8 is an external view of a sixth preferred embodiment.

Next, FIG. 8 is an external view of a sixth preferred embodiment according to the present invention, in which a scanner unit 62 is built into the back side of the printing unit 14.

According to this sixth preferred embodiment, the scanner unit 62 is built into the back side of the printing unit 14 at the tip, when a side on which the key inputting unit 12 and the display unit 13 of the handheld terminal 61 are installed is defined to be a front side. Furthermore, a switch 63 that controls ON/OFF of the emission of a laser beam is built in a slope portion of the scanner unit 62. Accordingly, a barcode can be read by aiming the scanner unit 62 in the tip of the handheld terminal 61 in the direction of the barcode.

According to this sixth preferred embodiment, the scanner 62 is built into the back side of the printing unit 14, whereby a barcode, etc. printed on a commodity or a box accommodating a commodity can be scanned in the upward, downward, left, and right directions in the state where the handheld terminal 61 is held in hand. Accordingly, a barcode, etc. can be read without degrading the usability of the handheld terminal 61.

The present invention is not limited to the above described preferred embodiments, and may be configured as follows.

(a) Although the printing unit 14 is built into the tip of the handheld terminals 11, 21, 31, 41, 51, and 61, it may be built into a different position such as the bottom, the back, etc.

(b) The scanner is not limited to a laser scanner which reads barcodes, and may be configured by a CCD sensor which reads an image, or the like.

(c) In the sixth preferred embodiment, the scanner 62 built into the back side of the printing unit 14 may be structured to be foldable on the side of the main body 61.

(d) The key inputting unit 12 may be of a touch panel type, and integrated with the display unit 13.

(e) The above described preferred embodiments refer to a handheld terminal having a printing unit. However, a camera (scanner) configured by a CCD sensor, etc., may be installed to be rotatable on the lateral side of a portable terminal device which does not have a printing unit, and a switch at the bottom of the camera may be used as a shutter button.

(f) The present invention is not limited to a handheld terminal, and applicable to a portable terminal device having an image sensor, a barcode reader, etc.

According to the present invention, an image reading unit for reading a barcode, etc. is built into the lateral side or the back side of a portable terminal device having a printing unit, thereby improving the usability when reading a barcode, etc. Additionally, a switch which turns on/off the image reading unit is built into the proximity of the image reading unit, whereby an image can be read by operating the switch with a finger in the state where the image reading unit is aimed at a target to be read.

The invention claimed is:

1. A portable terminal device, comprising:
   a display unit;
   a printing unit; and
   a scanner unit for reading a barcode, said scanner unit being built into a lateral side, between top and bottom sides, of a main body of the device;
   wherein said scanner unit is supported to be rotatable in an upward direction relative to the lateral side or a back side of the main body of the device, or on a plane parallel to the lateral side or the back side.

2. The portable terminal device according to claim 1, wherein a switch turning on the scanner unit is built into a position near the scanner unit on the lateral side of the main body that can be operated when the scanner unit is aimed at a target to be read.

3. The portable terminal device according to claim 1, wherein the scanner unit is supported to be rotatable on a plane parallel to the lateral side.

4. A portable terminal device according to claim 1, wherein the scanner unit is supported to be rotatable upwards relative to the lateral side of a main body of the device.

5. The portable terminal device according to claim 1, wherein the scanner unit is housed within the lateral side of the main body.

6. The portable terminal device according to claim 1, wherein the printing unit is comprised in an upper portion of the main body of the device, and the scanner unit is comprised on the lateral side of the main body of the device.

7. The portable terminal device according to claim 1, wherein the scanner unit is structured to be collapsible and may be housed in the lateral side of the main body.

* * * * *